3,814,823
MEAT ANALOGS HAVING THE FIBER
STRUCTURE OF MEAT
Jih Hsin Yang, Cincinnati, and Robert A. Olsen, Springfield Township, Hamilton County, Ohio, assignors to The Procter & Gamble Company, Cincinnati, Ohio
No Drawing. Filed Sept. 30, 1970, Ser. No. 77,032
Int. Cl. A23j 3/00
U.S. Cl. 426—362
16 Claims

ABSTRACT OF THE DISCLOSURE

A process of forming a meat-like protein-containing product having unidirectional parallel fiber structure similar to that of natural meat fiber structure. The process involves forming a protein mix containing a heat-coagulable protein, adjusting the moisture content of the protein mix to form a wet mix having a moisture content within the range of 20% to 80% by weight, mixing the wet mix to provide a coherent workable protein-containing dough, and thereafter subjecting the coherent workable protein dough to non-turbulent stretching and heat to provide unidirectional parallel meat-like fibers.

BACKGROUND OF THE INVENTION

As is well known by the consumer, the cost of meat and meat-based products is continually rising. The rising costs have forced many people to modify their nutritional intake in an effort to cut down upon the intake of expensive meat or meat-based products. The result, of course, is a diet which does not have sufficient protein present and therefore is nutritionally deficient.

Because of the rising cost of meat and meat-based products, and because of the real nutritional needs of many people which are not being satisfied, in recent years much work has been done in regard to preparing meat analog products. Meat analogs, or in other words synthetic meats, are advantageous when compared with natural meat products, not only from the standpoint of cost, but also from the standpoint of being low calories and actually higher in protein content. Therefore, meat analogs can be made superior from the standpoint of nutrition as well as cost.

Currently, meat analog products are made by two basic processes; that is, either fiber spinning or thermoplastic extrusion. The fiber spinning technique is an adaptation of the spun fiber method of making synthetic fibers utilized in the textile industry. In this method, fibrous protein products are prepared from proteins such as soy protein by forming a spinning dope from alkali-treated protein and extruding the dope through a perforated die or membrane into an aqueous precipitating bath which contains an acid and a salt. The acid bath sets the filaments or fibers which are formed in the bath. The filaments may be bundled together and stretched to orient the molecular structure of the fibers. For further details in regard to the fiber spinning technique, see the basic Boyer patent, No. 2,682,466, which relates to spun fiber meat analogs. Other patents relating to such a process include 2,730,448, and 2,730,447.

The other principal method of forming meat analog products is by thermoplastic extrusion which is an adaptation of technology involved in making ready-to-eat cereal food products. The thermoplastic extrusion process involves preparing a mixture of protein, water, flavor and other minors, and thereafter feeding this mixture into a cooker-extruder wherein it is subjected to heat and pressure, and subsequently extruding the mixture. The extrudate as it enters into the atmosphere expands to form what has been characterized as "meat-like" fibers.

For examples of patents describing thermoplastic extrusion techniques in forming meat analogs, see U.S. Pats. 3,102,031, 3,488,770, and British Pats. 1,174,906 and 1,105,904.

While both the fiber spinning technique adapted from the textile industry and the thermoplastic extrusion technique adapted from the ready-to-eat cereal industry have commonly been utilized to provide meat analog materials, it is generally recognized in the industry that the fiber spinning technique is most advantageous from the standpoint of forming actual fibers. However, the fiber spinning technique is quite expensive as well as complicated, and therefore the use of that technique tends to negate one of the primary purposes for forming meat analog products, i.e. an inexpensive meat substitute. Moreover, it is generally recognized by experts as well as consumers that neither of the above described processes actually produces a product which is meat-like in appearance and texture.

The lack of actual meat-like appearance and texture of many products presently being commercially sold has dampened consumer interest in such products. This is true regardless of what the flavor of any particular product might be, for one of the principal disadvantages with most of the meat analogs presently being sold is that the product fails to duplicate the long sinewy aggregation of muscle tissue which is present in natural meat products. Besides having bundles of fibers, natural meat products are also further characterized in that such fibers tend to be unidirectional and parallel. For examples of patents having as one of their primary objects the formation of meat-like appearances and textures, see U.S. Pats. 3,047,395 and 3,197,310.

Despite these prior art attempts, no known process has been developed which will allow the formation of muscle-like fibers which are parallel and unidirectional, and which have the appearance as well as texture of ordinary meat products. It is the object of this invention to provide such meat analogs, which in fact resemble in appearance and texture natural meats, by a process which is especially economical in that it does not involve individual fiber spinning, nor does it necessarily have to involve thermoplastic extrusion through a conventional extruder. In other words, because the process is economical and because the process forms a product having the appearance and texture of meat, the process is consistent with the primary objects of making meat analogs, i.e. simulating meat in texture and appearance and providing to the consumer such simulated meat analogs at low cost.

SUMMARY OF THE INVENTION

This invention relates to a meat analog product and to a method of making a meat analog product. The product is produced in such a manner that it closely, if not identically, resembles natural meats in texture as well as appearance. Like natural meats, the product of this invention is characterized by unidirectional parallel fiber structure. The process involves forming a dry protein mix, adjusting the moisture content of the dry mix to form a wet mix; mixing the wet mix to form a coherent workable protein dough and subjecting the dough to non-turbulent stretching and heat.

The method of achieving these and other objects will become apparent from the following description of the invention.

DETAILED DESCRIPTION OF THE INVENTION

As used hereinafter, the terms "protein mix" or "dry protein mix," the two being used interchangeably, are meant to include all of the dry ingredients as well as the fat. More specifically, dry protein mix includes protein, fat where it is employed, and all other ingredients exclusive of water. Amounts of each of these ingredients will be hereinafter specified as percent by weight of the dry mix only.

The term "wet mix" and "moisture adjusted protein mix," the two being used interchangeably, refer to the moisturized dry protein mix and the amount of moisture employed is expressed as percent by weight of the total wet mix, i.e. inclusive of moisture.

In the initial step of the process of this invention a protein mix is formed. The protein mix, which is subsequently moisture-adjusted to form a wet mix, can comprise from 30% to 100% by weight of a heat-coagulable protein, and preferably comprises from 50% to 100% by weight of a heat-coagulable protein. If amounts of heat-coagulable protein less than 30% by weight are employed, insufficient protein is present to produce meat-like fibers in subsequent processing steps. On the other hand, if desired, the protein mix can comprises 100% of a heat-coagulable protein.

While excellent fibers can be formed where the protein mix comprises 100% of a heat-coagulable protein, it is preferred from the standpoint of preparing the most palatable meat analogs that the protein content of the protein mix not be in excess of 80% by weight of heat-coagulable protein and most preferably not in excess of 70% by weight of heat-coagulable protein. Also, to produce the most palatable meat analogs the protein mix can contain up to 50% by weight of fat and preferably from 15% to 40% by weight of fat.

It is important to note that the protein portion of the protein mix has been described as a heat-coagulable protein. Of course the protein must also be a water-hydratable protein in order for effective moisturization to occur.

It is essential that the protein be a heat-coagulable protein in order to insure during the hereinafter described stretching and heating step that the protein can be heat-coagulated or heat-set to form parallel unidirectional fibers which do not revert to a non-fibrous structure after a short period of time.

No criticality exists with regard to the source of the heat-coagulable protein. Of course, the protein must be an edible protein material if it is to be incorporated in meat analog products which are designed for ingestion by humans. The usual source of such protein is vegetable protein; however, animal protein may also be employed. Examples of suitable vegetable protein sources are soybeans, safflower seed, corn, peanuts, wheat, peas, sunflower seed, cottonseed, coconut, rapeseed, sesame seed, leaf proteins, single cell proteins such as yeast, and the like. Generally, if the protein source is a vegetable protein, the protein prior to use is placed in a relatively pure form. Thus, for example, if the protein source is soybeans, the soybeans may be dehulled and solvent extracted, preferably with hexane, to remove the oil therefrom. The resulting oil-free soybean meal is then suspended in water and alkali is added to dissolve the protein and leave behind undissolved carbohydrates. Thereafter the protein is precipitated from the alkaline solution by the addition of an acidic substance. Precipitated protein is then washed and dried to prepare a substantially pure protein isolate. Similar methods can be utilized with regard to other cereal sources of protein.

If desired, animal protein sources can be used. These include animal proteins such as those derived from milk, poultry, meat and/or fish. A typical example of a suitable animal protein is egg albumen.

As previously mentioned, in order to make the most palatable meat analogs it is preferred that the protein mix contain up to 50% by weight of a fat and preferably from 15% to 40% by weight of a fat. Fats utilized in forming the protein mix suitable for use in this invention are well known and generally comprise liquid or semi-liquid glyceride shortening derived from animal, vegetable or marine fats and oils, including synthetically prepared shortenings. These glycerides can contain saturated or unsaturated "long chain" acyl radicals having from about 12 to about 22 carbon atoms such as lauroyl, lauroleoyl, myristoyl, myristoleoyl, palmitoyl, palmitoleoyl, stearoyl, oleoyl, linoleoyl, linolenoyl, arachidoyl, arachidonyl, behenoyl, erucopyl, and the like, and are generally obtained from edible fats and oils such as cottonseed oil, soybean oil, coconut oil, rapeseed oil, peanut oil, olive oil, palm oil, palm kernel oil, sunflower seed oil, rice bran oil, corn oil, sesame seed oil, safflower oil, wallflower oil, nasturtium seed oil, whale oil, sardine oil, herring oil, menhaden oil, pilchard oil, lard, tallow and the like. These glycerides can also contain, in part, one or two short chain acyl groups having from 2 to about 6 carbon atoms such as acetyl, propanoyl, butanoyl, valeryl, and caproyl; they can be prepared by random or low-temperature interesterification reactions of fatty triglyceride-containing oils and fats, such as interesterified or rearranged cottonseed oil and lard; and they can be otherwise formed by various organic syntheses.

While not critical to the process of this invention from the standpoint of producing unidirectional parallel meat-like fibers, but preferable from the standpoint of consumer acceptability, the protein mix can comprise not only heat-coagulable water-hydratable protein and fat within the ranges above specified, but also, depending upon the meat analog which is being prepared, certain specific amounts of other ingredients such as preservatives, flavoring, coloring, emulsifiers, stabilizers, vitamins, additional protein added for nutritional purposes, carbohydrates, and leavening.

In summary, the protein mix composition is generally as follows:

| Dry protein mix: | Percent by weight |
| --- | --- |
| Heat-coagulable protein | 30–100 |
| Fat | 0–50 |
| Other ingredients | 0–70 |

From the standpoint of low cost, as well as good fiber formation, soy protein and wheat protein are the preferred heat-coagulable proteins utilized in preparing the protein mix. Generally, vegetable protein sources are preferred over animal protein sources again primarily because of a cost factor.

The wet mix, i.e. moisture-adjusted dry mix composition, comprises:

| Wet mix: | Percent by weight |
| --- | --- |
| Dry mix | 80–20 |
| Water | 20–80 |

After forming the protein mix, the moisture content of the protein mix is adjusted to form a wet mix having a moisture content within the range of from 20% to 80% by weight of the wet mix. The moisture content of the wet mix should not exceed 80% by weight because higher moisture contents provide such a low viscosity that during subsequent processing little or no fiber formation will occur. On the other hand, moisture contents of the wet mix of less than 20% by weight are undesirable because the material is so viscous as to be extremely difficult to further process. Moreover, where the moisture content is less than 20%, the moisture-adjusted protein mix, i.e. the wet mix, is so viscous that little or no fiber formation can occur during subsequent processing steps. From the standpoint of process efficiency and optimum fiber formation, moisture contents of the wet mix within the range of from 30% to 60% by weight are preferred.

After the moisture content of the protein mix has been adjusted to within the range of from 20% to 80% by weight of the wet mix, the moisture-adjusted protein mix is mixed, at a temperature less than the heat-coagulation temperature of the heat-coagulable protein, to provide a coherent workable protein dough. The exact mixing time utilized in this mixing procedure as well as the optimum mixing time is dependent upon both the protein source utilized and the composition of the protein mix. With regard to wheat and soy protein, preferred mixing times and speeds are as follows: 0.5 minute to 15 minutes at speeds of from 50 to 250 revolutions per minute using a Hobart C100 planetary-type paddle mixer.

While as mentioned above no exact criticality exists with regard to the mixing time and speeds, a word of caution should be given in regard to overmixing. It has been found that in the case of some vegetable protein sources that mixing for long periods of time after the formation of a coherent workable protein dough has occurred will in fact harm the fiberforming properties of the particular vegetable protein source employed. In other words, while mixing time is not critical, one should be cautious from the standpoint of not overmixing and preferably the mixing time should be short but complete enough to form a coherent workable protein dough. Generally, complete mixing to provide a coherent workable protein dough occurs within the time range of from 0.5 minute to 45 minutes, and preferably from 0.5 minute to 15 minutes. Utilizing mixing times longer than 45 minutes has been found to substantially increase the propensity for fiber formation failures and regardless of the mixing speed employed, coherent workable protein doughs generally are formed in times substantially less than 45 minutes.

No criticality exists in regard to the type of mixing device employed and any of those generally available are suitable for the mixing step. For example, the mixer may be a planetary paddle mixer, a sigma mixer, a ribbon blender, a twin paddle mixer, a Hobart mixer, an extruder, and other well known mixers such as Omnimixers.

During the mixing operation in fact what occurs is the formation of an emulsion of the protein mix and the moisture to provide an emulsion which has the appearance of a coherent workable dough. In order to reduce the mixing time, it is preferred that the moisture-adjusted protein mix, i.e. wet mix, be mixed at slightly elevated temperatures. However, the only critical factor in regard to mixing temperature is that the temperature must be less than the heat coagulation temperature of the protein contained in the protein mix. For, if the temperature is above the heat coagulation temperature of the protein, the protein will be prematurely heat-set during the mixing procedure which is of course a highly turbulent procedure, and as explained hereinafter, that turbulence will destroy the chances of parallel fiber formation.

While the exact heat coagulation temperature varies depending upon the protein source employed, it has been found that generally the heat coagulation temperature of most proteins suitable for use in the process of this invention is at a temperature of less than 212° F. and generally at a temperature of greater than 140° F.

At the other end of the temperature scale, practical considerations dictate that mixing not occur at temperatures less than the freezing point of the mixture, i.e. 32° F. From the standpoint of overall processing efficiency and temperatures which provide rapid mixing to provide a coherent workable dough and yet are low enough to insure that premature heat coagulation will not occur, the range of from 40° F. to 140° F. is highly preferred.

After mixing is completed the moisture-adjusted protein mix, which is in reality an emulsion, has the appearance of a coherent workable dough very similar to bread dough. This coherent workable protein dough which is bread dough-like in texture, character and workability, is ideally suited for the last step of the process of this invention.

The final step of the process of this invention, and a step which is essential from the standpoint of providing unidirectional parallel meat-like fiber structure, is subjecting the coherent workable protein dough to non-turbulent stretching and heat. Stretching as used herein is intended to define the extending of the length of a material. For a common example familiar to all, an analogy can be drawn to the well known concept of "pulling taffy" where a taffy dough is pulled by applying approximately equal forces in opposite directions to each end of a taffy dough. As will be further explained below, the stretching must be non-turbulent.

The precise degree of stretching is not critical as it has been found that some fibers form as long as the stretching is non-turbulent. However, from the standpoint of preferred fiber quality the amount of linear expansion of the protein dough during stretching should be at least 15% and preferably from 50% to 150%.

Linear expansion as that term is used herein is defined by the following formula $$E = \frac{Lf - Li}{Li} \times 100$$

where E is the linear expansion of the protein dough expressed as a percent, $Li$ is the initial length of the dough portion which is to be subjected to stretching, and $Lf$ is the final length of the dough portion after stretching has occurred.

As previously mentioned on several instances, it is critical to the process of this invention that the stretching be non-turbulent stretching. For, it has been found that if any turubulence is introduced into the coherent workable protein dough during the stretching and heating, the turbulence will destroy the propensity for forming parallel unidirectional oriented muscle-like fibers, and any fibers that are formed will be randomly oriented and non-meat-like in texture as well as appearance.

The concept of turbulent and non-turbulent flow are well known to those skilled in engineering, and generally turbulence can be throught of as flow which is not streamline but rather the particles pursue erratic and continually varying courses. Of course, non-turbulent flow is just the opposite and is flow which is streamlined and the particles pursue predictable and non-varying courses. In terms of Reynolds numbers, a common unit of measurement for turbulence, the Reynolds number of the coherent dough during stretching should not exceed 2000. At Reynolds numbers above 2000, too much turbulence exists and the product does not have parallel unidirectional fibers.

No criticality exists with regard to the particular device employed to subject the coherent workable protein dough to non-turbulent stretching. The coherent workable protein dough can be subjected to such stretching by the well known "pulling taffy" method. Also, where the protein mix contains as part of the minors a leavening system such as $NaHCO_3$ and an appropriate acid, when the protein dough is heated in a vessel having smooth and tall confining walls, $CO_2$ is released from the leavening agent and causes expansion and unidirectional stretching along the walls of the confining vessel to provide parallel unidirectional fibers.

In addition, certain extrusion devices can be utilized. Those extrusion devices suitable for the process of this invention are devices capable of providing an externally heated channel of a gradually diminishing cross-sectional area. The cross section of the channel may be in the shape of a square, a parallelogram, a hexagon, or any other convenient shape. However, the most commonly utilized and available shape is circular in cross section and therefore having the form of a hollow truncated cone. When using such a device the material, i.e. the coherent workable protein dough, is gradually moved forward in laminar, i.e. non-turbulent, flow while simultaneously being heated by the walls of the chamber in order to cook and heat-coagulate the protein. In such a device no agitation or mixing can occur and the flow therethrough is truly non-turbulent. Other devices suitable for use herein would involve subjecting the coherent workable protein dough to outwardly oriented oppositely directed forces while the coherent workable protein dough is confined such that expansion can occur only unidirectionally.

In addition to subjecting the coherent workable protein dough to non-turbulent stretching, it is essential that the dough be subjected to heating at a temperature above the heat-coagulation temperature of the particular protein involved. Generally, this is a temperature in excess of 140° F. and usually within the range of from 155° F. to 400° F. At temperatures within this range the dough once subjected to non-turbulent stretching in order to orient the protein contained therein into one direction, is heat-set or heat coagulated in that particular orientation. Such heat-setting or heat-coagulation, the terms being used interchangeably herein, insures that subsequent fiber deterioration will not occur. Preferred heat-setting temperatures are within the range of from 170° F. to 300° F. Temperatures above 400° F. should be avoided in order to prevent adverse effects such as scorching of the protein dough or the corresponding meat analog.

It is preferred that stretching and heating occur simultaneously; however, if desired they can be done sequentially.

The following examples are offered to illustrate but not limit the process of this invention. Unless stated to the contrary, all percentages are given as weight percents.

Example 1

A dry protein mix having the following formulation was prepared.

| Ingredient | Amount, g. | Percent by weight of the dry protein mix |
|---|---|---|
| Soy protein isolate [1] | 200 | 55.7 |
| Egg white solids (egg albumen) [1] | 18.5 | 5.2 |
| Baking powder | 9.6 | 2.7 |
| Gelatin | 9.6 | 2.7 |
| Imitation beef flavoring | 19.5 | 5.3 |
| Caramel coloring | 2.3 | 0.6 |
| Soybean oil (I.V. 107) | 100 | 27.8 |

[1] Heat-coagulable protein.

The dry ingredients exclusive of the soybean oil were mixed for 5 minutes at low speed 60 r.p.m., in a Hobart mixer and thereafter the soybean oil which was hydrogenated to an iodine value of 107 was added and mixing continued for 5 minutes at medium speed 120 r.p.m. on the Hobart mixer. 250 grams of hot tap water at a temperature of approximately 135° F. was added to the mixture and the mixture was mixed for one additional minute at high speed 180 r.p.m. on a Hobart mixer to provide a coherent workable protein dough emulsion having a moisture content of 41%.

100 grams of the protein dough was placed in a 180 ml. tall beaker. The beaker was placed into boiling water for 1 hour. The approximate temperature of the protein dough contained in the beaker was 200° F. at the end of 1 hour. Because of the leavening system present and the application of heat, the material expanded unidirectionally parallel to the walls of the beaker and was therefore subjected to non-turbulent stretching. The Reynolds number during stretching was less than 2000 and the amount of linear expansion was measured and found to be about 150%.

Examination of the expanded product after simultaneous heating and stretching at the above specified conditions revealed a product having excellent fiber formation very similar to the fibers contained in chicken breast.

Example 2

A dry protein mix comprising the following ingredients was prepared.

| Ingredient | Amount, g. | Percent by weight of the dry protein mix |
|---|---|---|
| Wheat gluten [1] | 28.5 | 71.2 |
| Soybean oil (I.V. 107) | 10.0 | 25.0 |
| Egg white [1] | 1.5 | 3.8 |
| Total dry mix | 40 | |

[1] Heat-coagulable protein.

The dry mix was mixed with 60 grams of water to prepare 100 grams of protein dough comprising 40% by weight dry mix and 60% by weight water. Mixing was accomplished as follows: The egg white, water and oil were mixed in a Waring Blender at medium speed which is 10,000 r.p.m. for approximately 45 seconds and the wheat gluten was added slowly and mixed for approximately one minute to provide a coherent workable protein dough emulsion. The dough was poured into a 180 ml. tall beaker and heated in boiling water for 45 minutes during which heating to about 200° F. and simultaneous non-turbulent stretching occurred. The Reynolds number during stretching did not exceed 2000 and the amount of linear expansion was measured and found to be about 100%. After cooling, the product was examined and revealed to be very fibrous in structure and similar to chicken breast in fiber character.

Example 3

The process of Example 2 was repeated with the following protein mix formulation:

| Ingredient | Amount (g.) | Percent by weight of the dry protein mix |
|---|---|---|
| Dry egg white [1] | 100 | 100 |

[1] Heat-coagulable protein.

The egg white and 180 g. of water (34.7% protein, 65.3% water) were mixed and processed as described in Example 2 and found to give a product having excellent fiber formation.

Example 4

A dry protein mix having the following formulation was utilized in this example.

| Ingredient | Amount (g.) | Percent by weight of the dry protein mix |
|---|---|---|
| Wheat gluten [1] | 31 | 62 |
| Soybean oil (I.V. 107) [1] | 14 | 28 |
| Egg white solids | 1.8 | 3.6 |
| Beef bouillon flavoring | 2.1 | 4.2 |
| Coloring and other minors | 1.1 | 2.2 |

[1] Heat-coagulable protein.

The dry ingredients were mixed with 50 grams of water (which corresponds to 50% by weight water and 50% by weight dry protein mix) in a Hobart VCM mixer for approximately 2 minutes at a temperature of 100° F. The mixture was then extruded through a Brabender cooker/extruder Model 250. The extruder was heated to a temperature of 155° F. and the extrusion orifice comprised a hollow truncated cone having a circular cross section. The cone was of a continually decreasing diameter and at its widest diameter was 5/8 inch, and at its narrowest diameter was 3/16 inch. Because of the construction of the extruder outlet tube, no back flowing or turbulence was noted and therefore the Reynolds number never exceeded 2000. Because of the construction of the extruder, the mixture was simultaneously subjected to stretching and heat-setting. The amount of linear expansion was not measured precisely but estimated at about 150%.

Example 5

A dry protein mix having the following formulation was prepared.

| Ingredient | Amount (g.) | Percent by weight of the dry protein mix |
|---|---|---|
| Soy protein [1] | 3,140 | 56.8 |
| Dry egg white protein [1] | 285 | 5.1 |
| Baking powder | 150 | 2.7 |
| Gelatin | 150 | 2.7 |
| Caramel coloring | 45 | 1.2 |
| IFF meat flavor | 250 | 4.5 |
| Hydrogenated soybean oil (I.V. 107) | 1,500 | 27 |
| Red dye solution | 90 } | (²) |
| Blue dye solution | 15 } | |

[1] Heat-coagulable protein.
² Computed as part of H₂O.

The dry ingredients were placed in a Hobart mixing bowl and mixed at low speed for 5 minutes. Thereafter the soybean oil was added and mixing at medium speed occurred for an additional 5 minutes. 3750 grams of water which included the weight of dye solution was added and mixing continued for 1½ additional minutes at medium speed to provide a coherent workable protein dough emulsion which comprised 67% by weight moisture. The temperature during the mixing step was 100° F.

The coherent workable protein dough was transported through a device referred to as a "dual, steel-belted, converging conveyor." In this device, comprising two substantially synchronized, heated, steel-belted conveyors, a substantially horizontal portion of a first endless conveyor has a portion of a second endless conveyor superposed above it so that the conveyors have a converging gap formed therebetween. Considering the coherent workable protein dough between the belts as an infinite number of infinitesimally short transverse sections, each transverse section was dammed by the relatively large masses of dough in front of and behind it. By thus being restrained longitudinally to substantially preclude longitudinal expansion, non-turbulent stretching occurred as the dough was conveyed from the wide end of the converging gap to the narrow end of the converging gap intermediate the conveyor belts. At no time did the Reynolds number exceed 2000. As the dough was conveyed through the converging gap, it was being heated to a temperature of about 190° F. in order to provide heat-setting. The approximate time for subjection to heating and simultaneous non-turbulent stretching was 50 minutes. The product was examined and revealed to have parallel fibers very meat-like in appearance. The amount of linear expansion was estimated to be 100%.

We claim:

1. A process of forming a meat-like protein product having a unidirectional parallel fiber structure, said process comprising forming a protein mix, said protein mix containing from 30% to 100% by weight of a heat coagulable protein; adjusting the moisture content of the protein mix to form a wet mix having a moisture content within the range of from 20% to 80% by weight of the wet mix; mixing the wet mix at a temperature less than the heat coagulation temperature of the heat coagulable protein in said mix to provide a coherent workable protein dough; and thereafter subjecting said coherent workable protein dough to non-turbulent stretching and heat at a temperature above the heat-coagulation temperature of the heat-coagulable protein contained in said dough to provide a unidirectional parallel meat-like fiber structure, said stretching and heating occurring either simultaneously or sequentially and when accomplished sequentially, stretching occurs prior to heating.

2. The process of claim 1 wherein stretching and heating occur simultaneously.

3. The process of claim 1 wherein the amount of linear expansion during stretching is at least 15%.

4. The process of claim 3 wherein the amount of linear expansion during stretching is from 50% to 150%.

5. The process of claim 4 wherein the protein mix comprises from 50% to 100% of heat coagulable protein.

6. The process of claim 5 wherein the protein mix comprises not in excess of 80% heat coagulable protein.

7. The process of claim 6 wherein the protein mix comprises not in excess of 70% heat coagulable protein.

8. The process of claim 4 wherein the moisture content of the wet mix is adjusted to within the range of from 30% to 60% by weight.

9. The process of claim 4 wherein the wet mix is mixed at a temperature of less than 140° F. to provide a coherent workable protein dough.

10. The process of claim 9 wherein the mixing temperature is within the range of 40° F. to 140° F.

11. The process of claim 4 wherein in said coherent workable protein dough, while being subjected to non-turbulent stretching, is heated to a temperature within the range of from 155° F. to 400° F. in order to heat set the heat coagulable protein contained in said dough.

12. The process of claim 11 wherein said coherent workable protein dough while being subjected to non-turbulent stretching, is heated to a temperature within the range of from 170° F. to 300° F. in order to heat-set the heat coagulable protein contained in said dough.

13. The process of claim 4 wherein the heat coagulable protein is wheat protein.

14. The process of claim 4 wherein the heat coagulable protein is soy protein.

15. The process of claim 4 wherein the protein mix contains from 0% to 50% by weight of fat.

16. The process of claim 4 wherein the protein mix contains from 15% to 40% by weight of fat.

References Cited

UNITED STATES PATENTS

| 670,283 | 3/1901 | Kellogg | 99—83 |
| 3,488,770 | 1/1970 | Atkinson | 99—17 |

A. LOUIS MONACELL, Primary Examiner

J. R. HOFFMAN, Assistant Examiner

U.S. Cl. X.R.

426—345, 346, 364, 496, 506, 516, 802